US008204106B2

(12) United States Patent
Sadowski et al.

(10) Patent No.: US 8,204,106 B2
(45) Date of Patent: Jun. 19, 2012

(54) ADAPTIVE COMPRESSION OF VIDEO REFERENCE FRAMES

(75) Inventors: Greg Sadowski, Cambridge, MA (US); Thomas E. Ryan, Boylston, MA (US); Daniel Wong, Cupertino, CA (US); Paul Chow, Richmond Hill (CA)

(73) Assignees: ATI Technologies, ULC, Markham, Ontario (CA); Advanced Micro Devices, Inc., Sunnyvale, CA (US)

( * ) Notice: Subject to any disclaimer, the term of this patent is extended or adjusted under 35 U.S.C. 154(b) by 1252 days.

(21) Appl. No.: 11/940,228

(22) Filed: Nov. 14, 2007

(65) Prior Publication Data

US 2009/0122870 A1 May 14, 2009

(51) Int. Cl.
*H04B 1/66* (2006.01)

(52) U.S. Cl. .................... 375/240; 375/240.25

(58) Field of Classification Search .............. None
See application file for complete search history.

(56) References Cited

U.S. PATENT DOCUMENTS

| | | | | |
|---|---|---|---|---|
| 6,529,551 B1 * | 3/2003 | Yu et al. | ................... | 375/240.03 |
| 2005/0122335 A1 * | 6/2005 | MacInnis et al. | .............. | 345/520 |
| 2006/0271749 A1 * | 11/2006 | MacInnis | ...................... | 711/154 |
| 2007/0058614 A1 * | 3/2007 | Plotky et al. | ................... | 370/352 |
| 2007/0195882 A1 * | 8/2007 | Tichelaar et al. | ......... | 375/240.16 |
| 2008/0063290 A1 * | 3/2008 | Lin et al. | ....................... | 382/236 |

OTHER PUBLICATIONS

International Telecommunication Union, Telecommunication Standardization Sector of ITU, "Series H: Audiovisual and Multimedia Systems, Infrastructure of Audiovisual Services—Coding of Moving Video, Advanced Video Coding for Generic Audiovisual Services", H.264, (Nov. 2007).
The International Organization for Standardization/The International Electrotechnical Commision, "Information Technology—Coding of Audio-Visual Objects—Part 2: Visual", ISO/IEC 14496-2, (Dec. 1, 2001).
The International Organization for Standardization/The International Electrotechnical Commission, "Information Technology—Coding of Audio-Visual Objects—Part 10: Advanced Video Coding", ISO/IEC 14496-10, (Oct. 1, 2004).
The Society of Motion Picture and Television Engineers, "SMPTE Standard, VC-1 Compressed Video Bitstream Format and Decoding Process", SMPTE 421M-2006, (2006).

* cited by examiner

*Primary Examiner* — Chirag Shah
*Assistant Examiner* — Salvador E Rivas
(74) *Attorney, Agent, or Firm* — Volpe and Koenig, P.C.

(57) ABSTRACT

The subject matter disclosed herein provides methods and apparatus, including computer program products, for providing intermediate compression or decompression for use with a video decoder and a memory. In one aspect, there is provided a method including receiving information to enable compression of a macroblock. At an intermediate section coupled to a video decoder and a memory, a macroblock may be compressed. The compression of the macroblock may be based on the received information. The compressed macroblock may be provided to memory. Related apparatus, systems, methods, and articles are also described.

20 Claims, 4 Drawing Sheets

ADAPTIVE COMPRESSION OF VIDEO REFERENCE FRAMES

FIELD

The present disclosure generally relates to image processing.

BACKGROUND

Processing of video data often includes receiving a stream of video data and rendering for presentation on a display device. The video data includes video frames and/or video fields. Typically, video frames are generated for presentation on composite display devices, such as cathode ray tube (CRT) monitors, high definition (HD) televisions, and/or liquid crystal display (LCD) panels, while video fields are typically presented on interlaced devices such as traditional television sets. A video coder may compress the video data before storage or transmission.

To display or further process the video data, the video data (also referred to as image data, image data bit stream, digital video, or video data stream) may be processed by a variety of devices including a video decoder. The video decoder may process (e.g., decompress) video data compressed in accordance with a standard, such as H.264, MPEG-2, MPEG-4, VC-1, and the like. For example, the MPEG-2 standard prescribes an architecture for an MPEG-2 video decoder including aspects such as a variable length decoding section, an inverse quantization section, an inverse discrete cosine transform section, a motion prediction section, and memory. Likewise, the Blue Ray disc format prescribes, among other standards, H.264 for video compression of high definition (HD) video stored on the Blue Ray disc, and prescribes H.264 for the decompression of any video played back from that disc. When the video decoder includes coding mechanisms (e.g., a compression section to compress uncompressed video data), the video decoder is referred to as a video coder-decoder (or codec).

The implementation of any video decoder architecture is complex and thus costly. Moreover, the complex processing requires additional memory to process the video data and requires additional bandwidth to handle the complex processing—further increasing the cost of implementing the video decoder and its associated memory.

SUMMARY

The subject matter disclosed herein provides methods and apparatus, including computer program products, for providing intermediate compression and decompression for use with a video decoder and a memory.

In one aspect, there is provided a method including receiving information to enable compression of a macroblock. At an intermediate stage coupled to a video decoder and a memory, a macroblock may be compressed. The compression of the macroblock may be based on the received information. The compressed macroblock may be provided to memory.

The subject matter described herein may be implemented to realize the advantages of reducing, in a system including a video decoder and memory, one or more of memory size and memory bandwidth. Moreover, by reducing these aspects of a system, the subject matter described herein may, in some implementations, reduce cost.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
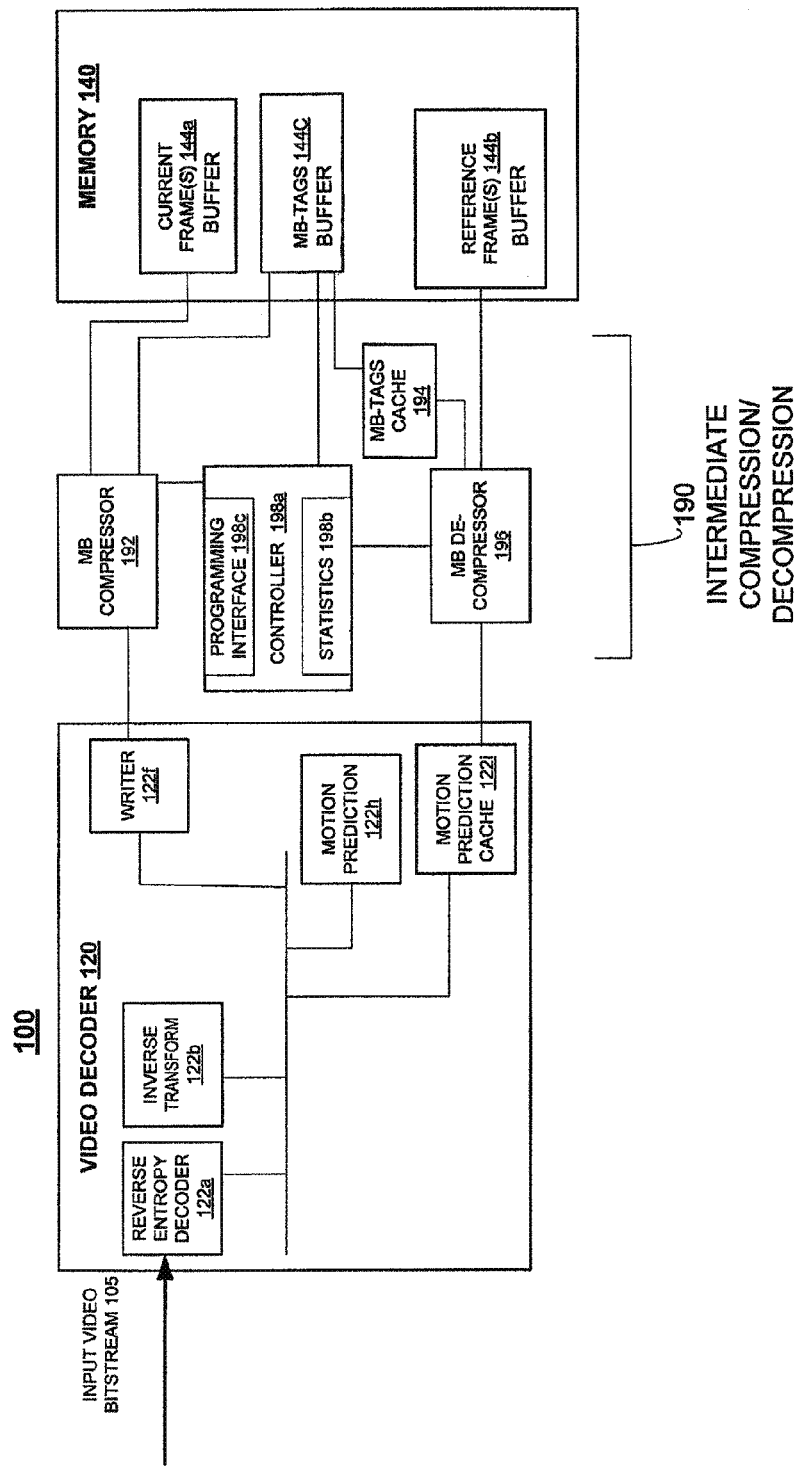
FIG. 1 depicts a block diagram of a video decoder including intermediate compression and decompression.

Like labels are used to refer to same or similar items in the drawings.

DETAILED DESCRIPTION

The H.264 video decoding standard requires up to 1.6 Gigabyte (GB) per second memory read bandwidth and about 20 Megabytes of memory buffer, while other video decoding standards, such as VC-1 and MPEG2 are similarly demanding with respect to memory bandwidth and the size of the memory buffer. The subject matter described herein relates to providing intermediate data compression and decompression between the video decoder and a memory system to optimize at least one of the memory bandwidth and the memory buffer size. Memory size refers to the amount of memory occupied in memory, while memory bandwidth refers to the bandwidth required to write to, or read from, memory (e.g., bits per second as well as the time to write to or read from memory). Optimization may refer to any reduction in memory bandwidth or memory size (or a combination of both) that may be achieved when compared to not using intermediate compression. By reducing memory bandwidth or the memory buffer size (or a combination of both), a video decoder may be able to operate using less memory (e.g., a smaller cache on the video decoder) and operate across a broader range of systems since memory bandwidth is decreased. Moreover, subject matter described herein may adapt optimization to memory conditions and/or bandwidth conditions on a per-block (e.g., macroblock) basis as well as on a specific system state.

FIG. 1 depicts a system 100 including a video decoder 120, a memory 140, and intermediate compression and decompression 190, including a controller 198a, a macroblock (MB) compressor 192, a MB tags cache 194, and a MB decompressor 196.

The video decoder 120 may receive video data as an input video bit stream 105. The input video bit steam may be in any format including any compressed video data format, such as MPEG-1, MPEG-2, MPEG-4, H.264, and VC-1. The video decoder 120 processes the input video bit stream 105 using a variety of sections (also referred to as modules, blocks, or stages) including a reverse entropy decoder 122a, an inverse image transform (e.g., a discrete cosine transform (DCT)) 122b, a motion prediction 122h (also referred to as motion compensator), and a writer 122f. Although video decoder 120 depicts a variety of sections, other sections may be included as well.

The reverse entropy decoder 122a (also referred to as entropy decoding) is a technique used to decode large amounts of data by examining the frequency of patterns within the data. In particular, a reverse entropy decoder may be used to decompress data by replacing symbols represented by codes (where the length of each codeword is proportional to the negative logarithm of the probability) with symbols represented by equal-length codes. Examples of reverse entropy encoders and decoders include CABAC (Context-based Adaptive Binary Arithmetic Coding) and Huffman coding.

The inverse transform 122b performs an inverse transform (e.g., a DCT) of the compressed video to decompress the video data. The inverse transform is often performed in blocks of pixels that are 8 pixels by 8 pixels (8×8) or 4 pixels by 4 pixels (4×4). The 8×8 block represents a portion of an image (e.g., a frame or fields) of video data. In the case of H.264, video decoder 120 may process the video data as a 16×16 block of picture samples or pixels. Once the video data has been processed by the inverse transform, additional decoding, such as motion prediction, is performed to further decompress and recover the original, uncompressed video data. Although FIG. 1 depicts inverse transform 122b, other coding and/or compression mechanisms may be used as well.

Once inverse transform 122b decompresses the video data, motion prediction section 122h generates the fully decoded video images. Motion prediction 122h uses predictive coding to predict future frames from previous frames stored in memory 140, such as one or more reference frames in reference frame buffer 144b, which may be cached in motion prediction cache 122i. For example, if an image sequence includes moving objects, then their motion within an image scene (or sequence of pictures) would be measured, and this information would be used to predict the content of other frames.

Writer 122f writes to one or more buffers, such as current frame buffer 144a in memory 140. The writer 122f is a write port for writing to current frame buffer 144a. Moreover, the output of writer 122f is a decompressed bit stream. The decompressed bit stream may be in the form of macroblocks. A macroblock refers to a block of data representing pixels (e.g., data representing a 16×16 block of pixels, 8×8 block of pixels, or any other size or arrangement of pixels).

Rather than write the macroblocks directly into memory 140, the macroblocks are processed by intermediate compression and decompression 190. Specifically, MB compressor 192 may provide intermediate compression to the macroblock output of the writer 122f. Moreover, the MB compressor 192 may adapt its compression to optimize for memory bandwidth and/or memory size (also referred to as footprint), or a combination of both. For example, writer 122f may output an uncompressed macroblock. When that is the case, there may be metadata in the bit stream describing characteristics of the macroblock, such as compression ratio, error rate, MBAFF modes, interlaced, progressive, as well as other statistics, metrics, and characteristics representative of the macroblock output of writer 122f. For example, the bandwidth (as bandwidth per frame, maximum bandwidth, etc.) may be measured at intermediate stage 190, compressor 192, or writer 122f, so that when the bandwidth (e.g., average or peak bandwidth) exceeds a threshold the compressor may implement a stronger compression algorithm. Other statistics, such as bit rate, latency, presence of CABAC, frame type, and the like, may be used as well to adapt, either on a bit stream or per macroblock basis, the intermediate compression provided by compressor 192. Moreover, in cases where bandwidth is reduced, there may also be a corresponding decrease in power—thus saving power. In some implementations, metadata is provided to controller 198a and cached in statistics block 198b.

Controller 198a may use the metadata cached in 198b to determine whether and how to compress the macroblock, Specifically, controller 198a may include a limit (e.g., set by a browser through a programming interface 198c at the controller 198a) specifying for the macroblock the maximum bandwidth or memory size (or a combination of both). For example, the limit may specify that a 16×16 macroblock must be compressed by at least a factor of four and that optimization on memory size should be implemented Based on the metadata and the limit information, MB compressor 192 may adapt compression of a block to satisfy the limit.

In some cases, a lossless compression scheme may be used as a default compression scheme by MB compressor 192. In this case, the controller 198a would provide an indication to MB compressor 192 to adapt its compression (e.g., to a lossy compression scheme) when a target compression ratio is not being achieved and, as such, the specified limit regarding memory size and/or maximum memory bandwidth is in jeopardy of not being achieved.

Moreover, controller 198a may use metadata stored at 198c to provide an indication to MB compressor 192. Examples of such metadata include metadata and statistics describing the compression ratio achievable on a block, temporal moving average compression ratio (and deviation) of macroblocks in the current location within the frame, accumulated error ratio for the current frame (if lossy compression was used), and the like. The indication may enable MB compressor 192 to adapt, on a per block basis, whether to provide lossy compression to the macroblock, provide very lossy compression, provide a lossless compression algorithm, or not compress at all. In any case, for each macroblock output by MB compressor 192, information describing the block, such as whether compression was performed, the type of compression, the amount of compression, and the like, may be stored as a so-called "tag" in MB-tags buffer 144c in memory 140. The compressed block may be stored in memory 140 as a current frame in the current frame buffer 144a or as reference frames in the reference frame buffer 144b.

When motion predictor 122h requires reference frames to predict motion. MB decompressor 196 may decompress video data stored in memory 140. Specifically, MB decompressor 196 may access one or more macroblocks stored in reference frames in the reference frame buffer 144b (as well as a current frame in the current frame buffer 144a). MB-tags cache 194 may also retrieve and cache one or more MB tags in the MB-tags buffer 144c associated with one or more macroblocks stored in memory 140.

On a per macroblock basis, MB decompressor 196 may receive a tag from MB-tags cache 194 describing whether and how decompression was performed to the macroblock. The tag thus enables the MB decompressor 196 to properly decompress the macroblocks stored in memory 140. The decompressed macroblocks may then be provided to motion prediction cache 122i to form a frame of video, which can then be used by motion prediction 122h to predict motion as described above. Although the description herein refers to motion prediction 122h using reference frames in the reference frame buffer 144b processed by intermediate compression 190, other blocks in video decoder 120 may use the reference frames as well. For example the de-blocking filter may need pixels surrounding a filtered macroblock, and those pixels may have to be fetched from the intermediately-compressed macroblocks in memory.

Figure 2:
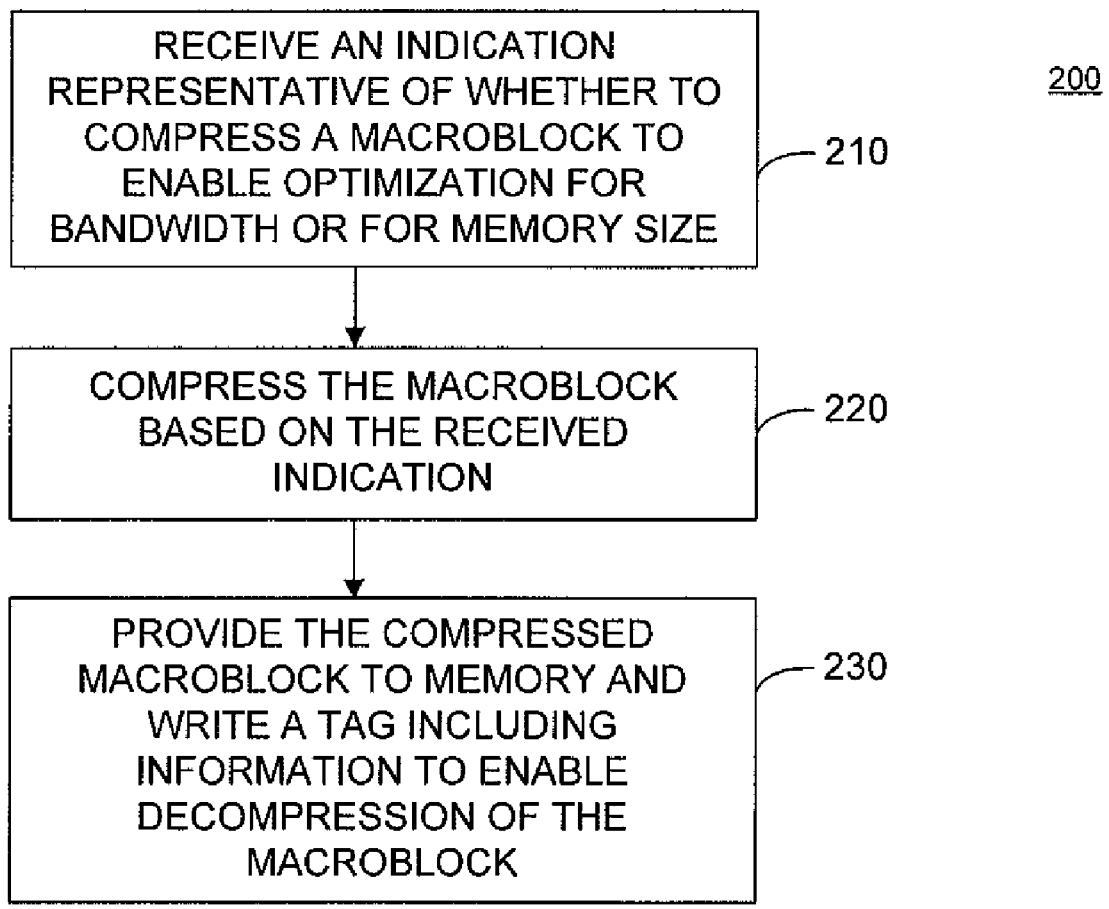
FIG. 2 depicts a process for intermediate compression.

FIG. 2 depicts a process 200 for using an intermediate compression and decompression block. At 210, MB compressor 192 may receive from controller 198a an indication (e.g., one or more messages, calls, etc.) representative of whether to compress the macroblock to enable optimization for bandwidth, memory size, or both. For example, a user at a user interface or another program may access a program interface 198c at controller 198a and specify that compression should optimize on memory size, bandwidth, or both, as well as specify a limit (e.g., a target bandwidth, a target memory size, and a target compression ratio). When this is the case, the information received at controller 198a may be used to provide an indication to enable MB compressor 192 to compress a macroblock.

At 220, MB compressor 192 may compress the macroblock based on the received indication.

At 230, MB compressor 192 may provide (e.g., write, send, make accessible, or the like) the compressed macroblock to memory as well as write a tag in MB tags memory 144c. As described above, the tag includes information to enable decompression of the macroblock associated with that tag.

Figure 3:
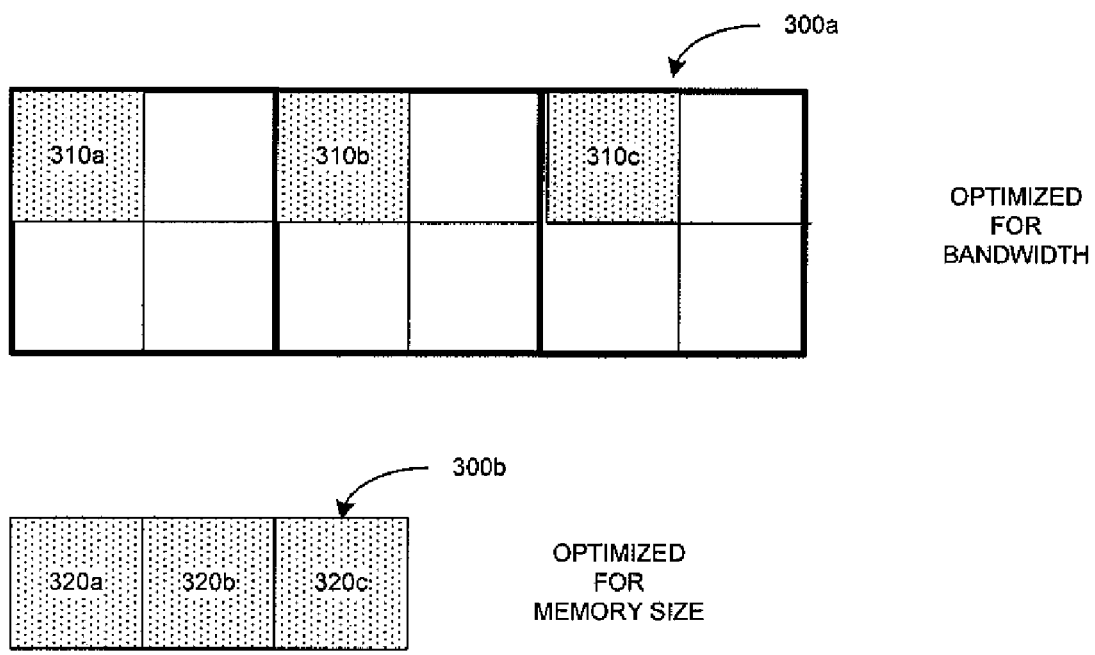
FIG. 3 depicts a frame of video data compressed to enable optimization with respect to memory bandwidth or to enable optimization with respect to memory size.

FIG. 3 depicts an example frame 300a including one or more macroblocks 310a-c written to memory 140. In the frame frame 300a, the macroblocks 310a-c represent macroblocks that have been compressed by a factor of four. Since optimization on bandwidth is specified rather than memory size, the compressed macroblocks 310a-c require the same size (or footprint) in memory 140 as an uncompressed frame. However, when frame frame 300a is read from or written to memory 140, less memory bandwidth is required since frame frame 300a is more sparse due to compression of its macroblock content. On the other hand, frame 300b represents compression by a factor of four with optimization on memory size. In this case, memory size in memory 140 is saved by a factor of four. Referring to frame 300b, macroblocks 320a-c correspond to compressed macroblocks (e.g., macroblocks 310a-c).

Figure 4:
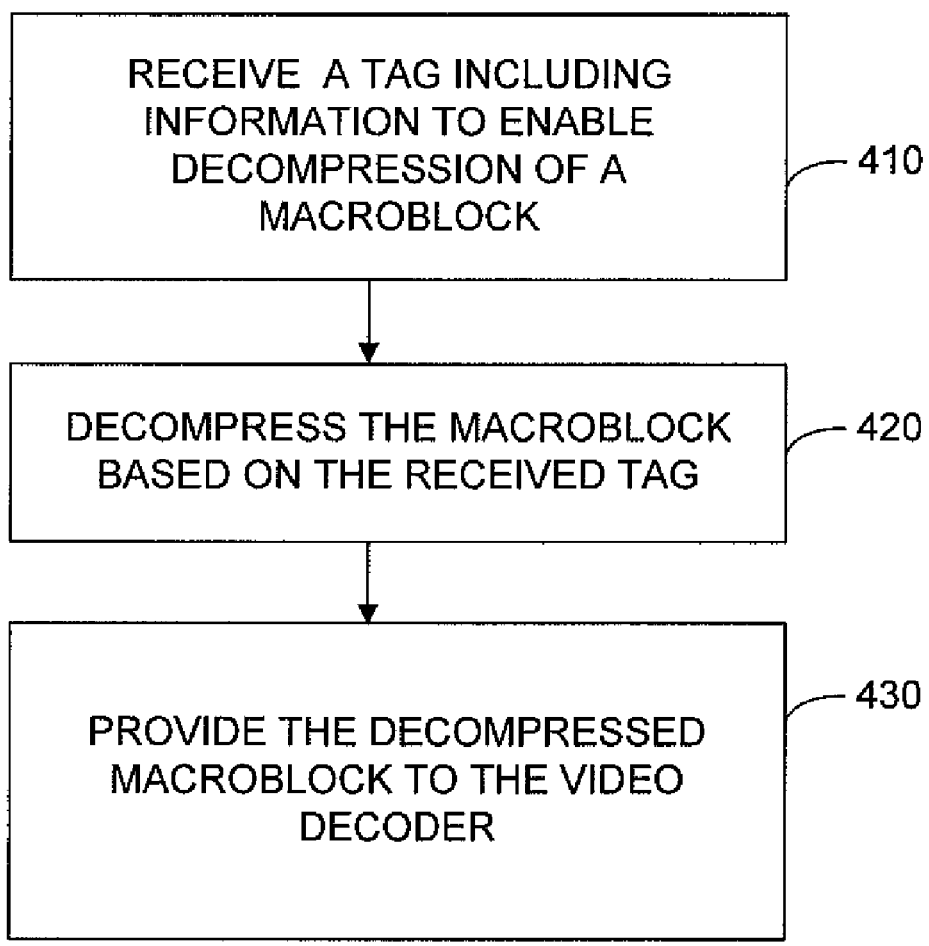
FIG. 4 depicts a process for intermediate decompression.

FIG. 4 depicts a process 400 for using intermediate compression and decompression. At 410, MB decompressor 196 may receive a tag accessed from MB tags cache 194. The tag may include information to allow MB decompressor 196 to decompress a compressed macroblock stored in memory 140 (e.g., as a current frame 144a or a reference frame 144b).

At 420, MB decompressor 196 may then decompress the macroblock based on the received tag. For example, MB decompressor 196 may receive from memory 140 a macroblock previously compressed by MB compressor 192. The MB decompressor 196 may use the tag information to determine what type of compression was performed on the macroblock and then decompress the macroblock.

At 430, the macroblock may be provided to motion prediction cache 122i. Motion prediction 122h may then read the macroblock (or reference frame) in motion prediction cache to predict motion in a current frame, as described above. Although the description herein refers to the decompressed macroblock being used by the motion prediction section of video decoder 120, the decompressed macroblock from MB decompressor may by used by any section of video decoder 120 that requires access to previous frames or reference frames of video data. Moreover, data, other than video pixel data that is stored in memory for the later use by video decoder or other functional block, may be subjected to intermediate compression for the same reason as described above.

In some implementations, the output of writer 122f may change. For example, the output of writer 122f may changes based on picture level changes, so that if the so-called "pictures" in the video data change every 30 milliseconds, the output of writer 122f may also change. One example of such picture level changes is H.264 Macroblock-Adaptive Frame/Field (MBAFF) coding. When a MBAFF mode is used in a compressed bit stream, field encoding or frame encoding may change from macroblock to macroblock. Moreover, the writer 122 may write in an interlaced format or a progressive format based on the encoding used on any given macroblock. Furthermore, when MBAFF is used, the video data may change from an actual frame of actual picture information to one or more fill frames. In some implementations, writer 122f suppresses writing to picture buffer 144a when the video decoder 120 and/or its internal processing modules do not require so-called "reference" pictures. Reference pictures enable processing in the video decoder 120. For example, reference pictures may be used by motion prediction 122h.

In the above instances as well as other instance where writer 122f provides different types of outputs, MB compressor 192 may adapt whether compression is performed on the block as well as the type of compression performed. For example, MB compressor 192 may adapt, based on statistics and metadata (described above), on a per macroblock basis to provide lossy compression to the macroblock, provide very lossy compression to the macroblock, provide a lossless compression to the macroblock, or not compress the macroblock at all.

TABLE 1 below provides examples of when DB compressor 192 would provide different types of compression.

TABLE 1

| Compression Type | Characteristics (e.g., statistics and metadata) When A Compression Type May Be Used |
| --- | --- |
| Lossy | For example, when non-reference pictures or lossless compression ratio is insufficient, lossy compression may be used. |
| Lossless | For example, when the accumulated frame compression ratio is better than required, lossless compression may be used. |
| Very Lossy | For example, when non-reference pictures or fixed memory size requires high compression ratio, a very lossy compression may be used. |
| No compression | For example, when data should not, or cannot be, compressed (or when in a test mode), no compression may be implemented for one or more macroblocks. |

The memory 140 may be implemented as any form of memory including RAM (random access memory), DRAM (dynamic RAM), SRAM (Static RAM), and any other mechanism of electronic data storage. Although FIG. 1 depicts memory 140 as separate from video decoder 120, in some implementations, memory 140 may be included within the same package or die as video decoder 120.

In some implementations, video decoder 120 and/or controller 198 may include an application-programming interface (API), such as programming interface 198c. The API may be called by another device, such as a program, a DVD player, a media player (e.g., Windows Media Player), a HD data source 205, and the like. For example, a device, such as a Windows Media Player or Blue Ray DVD player, may read a specific type of media (e.g., H.264 formatted video data), and a component (e.g., an interface, a user interface, such a browser or client application, and the like) associated with the device may then call the programming interface of video decoder 120 or controller 198 to provide information to enable the configuration of controller 198. For example, the information may specify a limit, such as a target memory bandwidth, memory size, or compression ratio limit, and the like.

Based on information provided, the call would configure compression and decompression at MB compressor 192 and MB decompressor 196.

Moreover, although the above describes particular image processing protocols as examples (e.g., H.264 and VC1), embodiments may be used in connection any other type of image processing protocols and standards. Although the above describes a video decoder, a video encoder may also be implemented using aspects similar to those described above. Although the description herein refers to macroblocks, other data formats may be used as well. Furthermore, any implementations described herein might be associated with, for example, an Application Specific Integrated Circuit (ASIC) device, a processor, a video encoder, video decoder, video codec, software, hardware, and/or firmware. In addition, to simplify the explanation of the features of the subject matter described herein, FIG. 1 depicts a simplified video decoder including only some of the sections, which may be included in a video decoder. Although video decoder 120, intermediate compression/decompression block 190, and memory 140 are depicted as separate, any of video decoder 120, intermediate compression/decompression block 190, and memory 140 may be incorporated into the same package, ASIC, chip, and the like.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment.

The foregoing description is intended to illustrate but not to limit the scope of the invention, which is defined by the scope of the appended claims. Other embodiments are within the scope of the following claims.

What is claimed:

1. A method for processing video data comprising one or more macroblocks, the method comprising:
    receiving information to enable compression of a first macroblock, the received information providing an indication representative of whether to adapt compression of the first macroblock to enable a reduction in at least one of a bandwidth or a memory size;
    compressing, at an intermediate section coupled between a video decoder and a memory, the first macroblock, the compressing adapted based on the received information;
    providing the compressed first macroblock to the memory; and
    performing compression on additional macroblocks on a per-macroblock basis, wherein the received information further indicates whether to adapt the compression to a lossy compression, a lossless compression, or no compression.

2. The method of claim 1, wherein the intermediate section further comprises:
    a compressor for compressing the first macroblock received from the video decoder, the compressed first macroblock stored in the memory;
    a controller, coupled to the compressor, for controlling compression by the compressor; and
    a decompressor for decompressing a second macroblock received from the memory.

3. The method of claim 2 further comprising:
    decompressing, at the intermediate section, the second macroblock based on a tag stored in a cache, the tag including information to enable decompression of the second macroblock.

4. The method of claim 2 further comprising:
    adapting the decompressing based on one or more statistics measured from the one or more macroblocks.

5. The method of claim 1 further comprising:
    adapting the compressing based on information obtained from a bit stream.

6. The method of claim 5 further comprising:
    determining statistics from the bit stream comprising one or more macroblocks.

7. A system comprising:
    a video decoder section coupled to an intermediate section, the intermediate section coupled to a memory, the intermediate section comprising:
    a controller for receiving information to enable compression of a first macroblock received from the video decoder and for controlling the intermediate section, the received information providing an indication representative of whether to adapt compression of the first macroblock to enable a reduction in at least one of a bandwidth or a memory size; and
    a compressor configured to perform compression on the first macroblock, based on the received information, and to provide the compressed first macroblock to the memory; wherein the compressor is further configured to perform compression on additional macroblocks on a per-macroblock basis, wherein the received information further indicates whether to adapt the compression to a lossy compression, a lossless compression, or no compression.

8. The system of claim 7, wherein the intermediate section further comprises:
    a decompressor for decompressing a second macroblock received from the memory.

9. The system of claim 8, wherein the decompressor further comprises:
    decompressing the second macroblock based on a tag stored in a cache, the tag including information to enable decompression of the second macroblock.

10. The system of claim 8, wherein the decompressor further comprises:
    adapting the decompressing based on one or more statistics measured from an input video bit steam comprising one or more macroblocks.

11. The system of claim 7, wherein the compressor further comprises:
    adapting the compressing based on information obtained from a bit stream.

12. The system of claim 11 further comprising:
    determining statistics from the input video bit stream comprising one or more macroblocks.

13. A non-transitory computer-readable medium containing instructions to configure a processor to perform a method, the method comprising:
    compressing, at an intermediate section coupled between a video decoder and a memory, a first macroblock received from the video decoder, the compressing based on information received to enable compression of the first macroblock, the received information providing an indication representative of whether to adapt compression of the first macroblock to enable a reduction in at least one of a bandwidth or a memory size;

providing the compressed first macroblock to the memory; and performing compression on additional macroblocks on a per-macroblock basis, wherein the received information further indicates whether to adapt the compression to a lossy compression, a lossless compression, or no compression.

14. The non-transitory computer-readable medium of claim 13, wherein the method further comprises:
    decompressing, at the intermediate section, a second macroblock received from the memory.

15. The non-transitory computer-readable medium of claim 14, wherein decompressing further comprises:
    decompressing the second macroblock based on a tag stored in a cache, the tag including information to enable decompression of the second macroblock.

16. The non-transitory computer-readable medium of claim 15, wherein the method further comprises:
    adapting the decompressing based on one or more statistics measured from a bit stream comprising one or more macroblocks.

17. The method of claim 1, further comprising:
    making a call to an application-programming interface, the call enabling configuration of an intermediate compression section, the intermediate compression section coupled to a video decoder section and coupled to a memory.

18. The method of claim 17, wherein making the call comprises:
    making the call using a hyper text transfer protocol (HTTP).

19. The system of claim 7, further comprising:
    an application-programming interface for receiving a call enabling configuration of the intermediate compression section based on provided limits for the compression.

20. The device of claim 19 further comprising:
    implementing the application interface as at least one of an interface, a user interface, and a browser.

* * * * *